United States Patent [19]

Gourdine

[11] Patent Number: 4,850,537

[45] Date of Patent: Jul. 25, 1989

[54] METHOD AND APPARATUS FOR PRODUCING MULTIVORTEX FLUID FLOW

[75] Inventor: Meredith Gourdine, Pearland, Tex.

[73] Assignee: Energy Innovations, Inc.

[21] Appl. No.: 939,060

[22] Filed: Dec. 8, 1986

[51] Int. Cl.[4] .......................... B05B 7/10; B05B 7/06; B05B 1/14; F23D 11/16

[52] U.S. Cl. .................................... 239/400; 239/406; 239/422; 239/424.5; 239/470; 239/555

[58] Field of Search ........................ 239/3, 8, 298, 400, 239/403-406, 422-424.5, 428, 429, 430, 470, 486, 696, 704, 706, 708, 555

[56] References Cited

U.S. PATENT DOCUMENTS

| | | | |
|---|---|---|---|
| 697,768 | 4/1902 | Woodward | 239/424.5 |
| 3,259,322 | 7/1966 | Biber et al. | 239/424 X |
| 3,618,858 | 11/1971 | Culp | 239/696 |
| 3,662,960 | 5/1972 | Mitchell et al. | 239/400 |
| 4,018,387 | 4/1977 | Erb et al. | 239/405 |
| 4,498,631 | 2/1985 | Gourdine . | |
| 4,738,400 | 4/1988 | Irwin | 239/555 X |

*Primary Examiner*—Andres Kashnikow
*Assistant Examiner*—Patrick N. Burkhart
*Attorney, Agent, or Firm*—David M. Ostfeld

[57] ABSTRACT

A multivortex device is provided comprising a series of adjacent plates with specially designed grooves and perforations which, when mounted transversely of a uniform fluid flow in a duct, results in the formation of numerous small adjacent flow vortices either all rotating in the same direction (co-vortices) or adjacent vortices rotating in opposite direction (counter-vortices). The fluid at the peripheries of adjacent co-vortices move in opposite directions and friction converts their rotational kinetic energy into turbulence within a few vortex diameters downstream from the multivortex device. The fluid at the peripheries of adjacent counter-rotating vortices move in the same direction, such that they roll upon one another substantially without friction and persist for many vortex diameters downstream from the multivortex device. The adjacent plates of the multivortex device can be provided with additional grooves and passageways which allow a second and/or third fluid to be introduced within each vortex. The high speed rotation of the first fluid can be used to act on the second and third fluids. A turbulent co-vortex field can be used to induce rapid mixing and chemical reaction, while a countervortex field can be used to remove particulates from the flow.

6 Claims, 8 Drawing Sheets

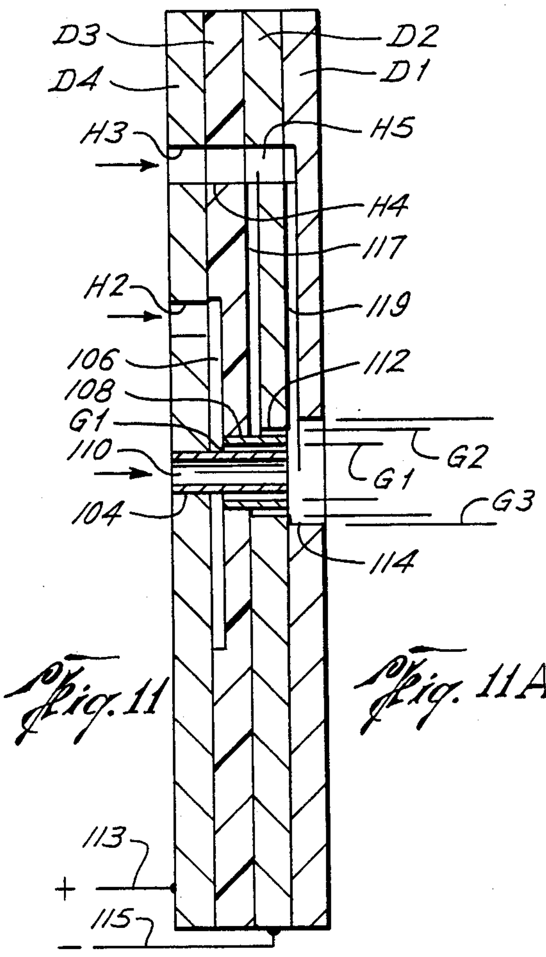
Fig. 11
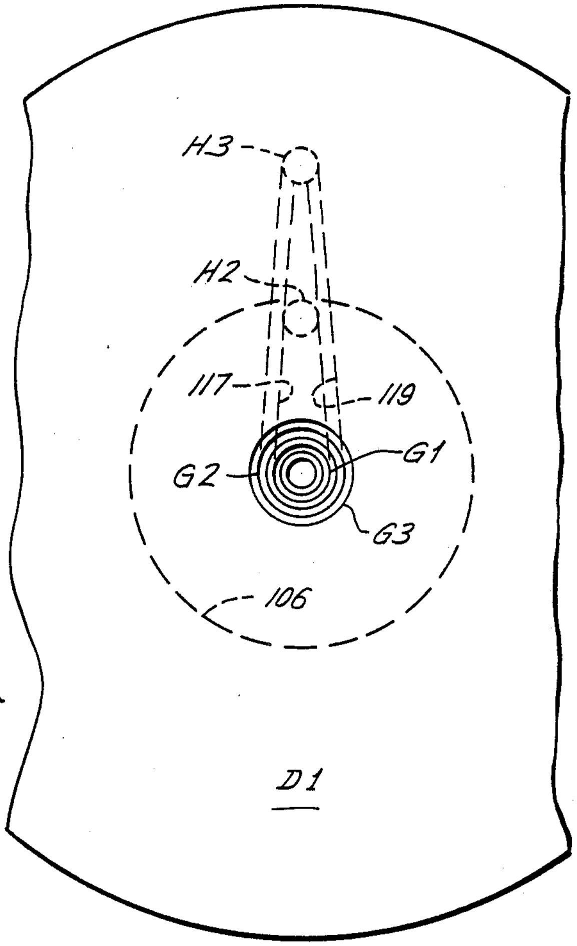
Fig. 11A
Fig. 12
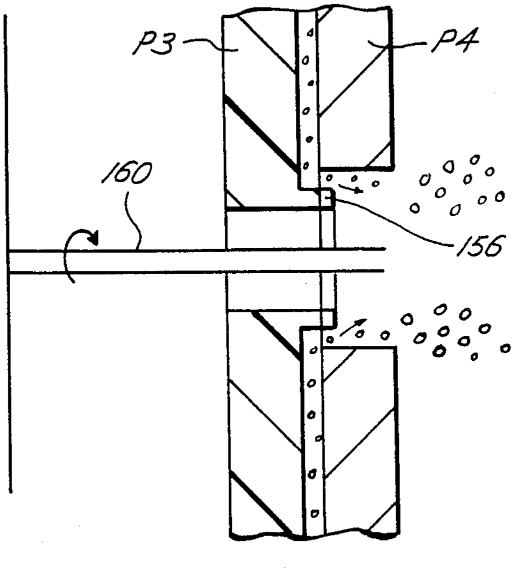
Fig. 13
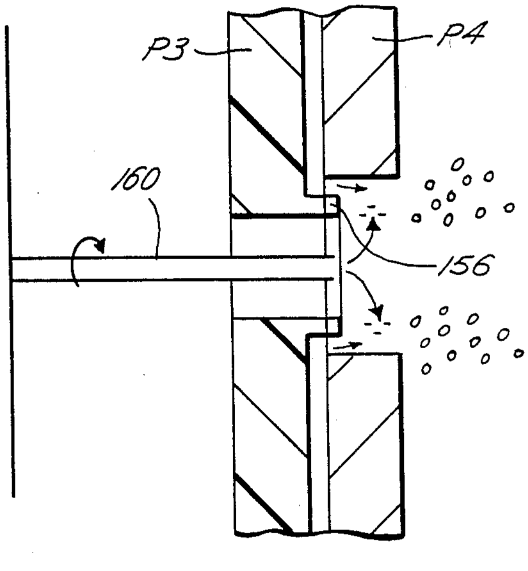

METHOD AND APPARATUS FOR PRODUCING MULTIVORTEX FLUID FLOW

BACKGROUND OF THE INVENTION

1. Field of the Invention

The present invention relates to vortex flow apparatus and methods. The present invention has been found particularly useful in producing a multivortex fluid flow from a uniform flow stream.

2. Description of the Prior Art

Current separation processes which employ vortex flow such as high speed cyclone separators rely upon centrifugal force of the vortex generated by a gas flow to provide intimate and vigorous interaction between the gas stream and a suitable liquid medium which is confined in the cyclone separator by the vortex generated by the gas flow. Such cyclone separators rely upon the tangential injection of gas into the Vessel through submerged jets or sheets dispersing the liquid and resulting in a strong gas/liquid interaction. Similarly, the Pall Land and Marine Corporation of Newport, Florida produces an air cleaning apparatus in which a fixed vane in a vortex generator imparts a swirling motion to a flowing stream of contaminated air. The swirling motion causes the heavier dirt and water droplets to be thrown radially outward by centrifugal force. The outer regions of the vortex are scavenged overboard while the clean "eye" of the vortex is directed through a central outlet tube. A panel array of such devices provides an efficient air cleaning system. Such current vortex flow generating devices rely upon a single vortex to provide mixing and/or separation.

SUMMARY OF THE INVENTION

The present invention relates to an apparatus and method for producing numerous small, adjacent vortices ("multivortex fluid flow") from a uniform fluid flow stream. The resulting vortices can all rotate in the same direction ("co-vortices"), or adjacent vortices can rotate in opposite directions ("countervortices"). The apparatus comprises a series of adjacent parallel plates adapted to be mounted in a position transverse to the uniform fluid flow. The plates include a series of perforations and grooves which impart a multivortex fluid flow to the uniform fluid flow as it passes therethrough. The apparatus may be provided with means to introduce a second or third fluid into each vortex whereby the high speed rotation of the first fluid can be used to atomize the second and third fluids. For this purpose, the plates can also be provided with additional grooves and holes which allow the second and/or third fluid to be introduced within each vortex, either at the periphery of each vortex or at the center of each vortex. The high speed rotation of the first fluid can thus be used to atomize the second and third fluids. A turbulent co-vortex field can be used to induce rapid mixing and chemical reactions. A countervortex field can be employed to remove particles from the fluid flow through the centrifugal force which throws the particles into the space between adjacent vortices where gravity causes the particles to fall out. Typical uses for a co-vortex generating device include paint mixing, paint or other fluid spraying with or without an electrical charge, combustion of fuel, as well as other applications. Some potential uses of a countervortex generating device include precipitation of particulates, scrubbing of noxious gas molecules from gases, precipitation of condensible vapors from gas, atomization, aeration and precipitation of ground water to remove volatile contaminants, as well as other applications. Such multivortex apparatus can also be used in efficient, compact fluid heat exchangers.

Co-vortices all rotate in the same direction so that the fluid at the periphery of adjacent vortices is moving in opposite directions. The resulting friction between adjacent vortices converts rotational kinetic energy into turbulence. The mean speed of the turbulence is initially much higher than the forward drift speed of the fluids. The present invention allows other fluids to be injected into the eye of each vortex, where the high speed rotation causes atomization and the fluids are mixed violently by the induced turbulence.

One objective of the present invention is to use a co-vortex device to atomize, charge, spray, and collect liquid and solid paint particles more efficiently and less expensively. By having the pigment particles suspended in air as the first fluid and a resin dissolved in solvent as the second fluid, the present invention will mix the components necessary to mass produce paint. Furthermore, if the air is hot enough, solvents will flash off and the result will be a charged dry powder paint that can be easily collected electrostatically.

Another objective of the resent invention is to provide an inexpensive, efficient combustor in which air serves as the first fluid and fuel such as pulverized coal or oil as a second fluid. The present invention provides for efficient atomization and mixing of the air and fuel to allow for efficient ignition.

Another objective of the present invention is to use a co-vortex device to finely atomize oil with air to form a dense turbulent plume of smoke. By electrically charging the oil drops, the neutral drops can be made to cluster around the charged drops and through clustering and electrostatic and gravitational forces reduce the plume of smoke when desired, thus providing the establishment and removal of a smoke screen.

The device of the present invention to produce multivortex fluid flow can also provide a countervortex device which establishes a vortex field consisting of a plurality of adjacent vortices rotating in opposite directions so that the fluid at the periphery of adjacent vortices is moving in the same direction. Such vortices roll upon one another with minimal friction and therefore persist for many vortex diameters downstream. Such a countervortex device allows the particles in the vortices to be thrown outwardly by centrifugal force into the spaces between adjacent vortices where the particles tend to agglomerate and are removed by gravity.

One objective of the present invention is to use a countervortex device to precipitate suspended particles from gases. Another objective of the present invention is to use a countervortex device to scrub noxious gas molecules from gas by injecting chemicals that react with undesirable molecules and cause particulates to form.

Another objective of the present invention is to provide a pulverized coal combustor with hot gas clean up and a heat exchanger directly in line thereby drastically reducing the size and cost of a coal combustor With associated air pollution control and energy conversion equipment. A multivortex heat exchanger which employs high speed rotating fluids to transfer heat through copper tubes to another rotating fluid on the other side of the tubes is much shorter than conventional heat exchangers because the heat transfer rate is greatly increased by the high speed rotation of the fluid while the fluid travels slowly in the axial direction.

Another objective of the present invention is to provide a multivortex heat exchanger to reduce the temperature of a gas until condensation occurs, condensate droplets are precipitated in a counter-rotating vortex fluid, and the gases are reheated in the heat exchanger. This results in an extremely compact low energy solvent recovery device. Such a solvent recovery device may be employed in a paint curing oven to recover both heat and solvent thereby reducing the size and cost of ovens for curing painted objects on production lines.

Another objective of the present invention is to employ a counter-rotating vortex device to atomize and aerate ground water containing volatile chemicals to conveniently and efficiently collect droplets of fresh water.

Another objective of the present invention is to employ concentric counter-rotating vortices to achieve internal atomization and charging without wetting the walls of the vortex generator.

BRIEF DESCRIPTION OF THE DRAWINGS

FIG. 11 is a cross-sectional side view of the alternative embodiment of the multivortex device of the present invention;

FIG. 12 is a cross-sectional side view of an alternate embodiment of the multivortex device of the present invention; and FIG. 13 is a cross-sectional side view of an alternate embodiment of the multivortex device of the present invention.

DESCRIPTION OF THE PREFERRED EMBODIMENT

Figure 1:
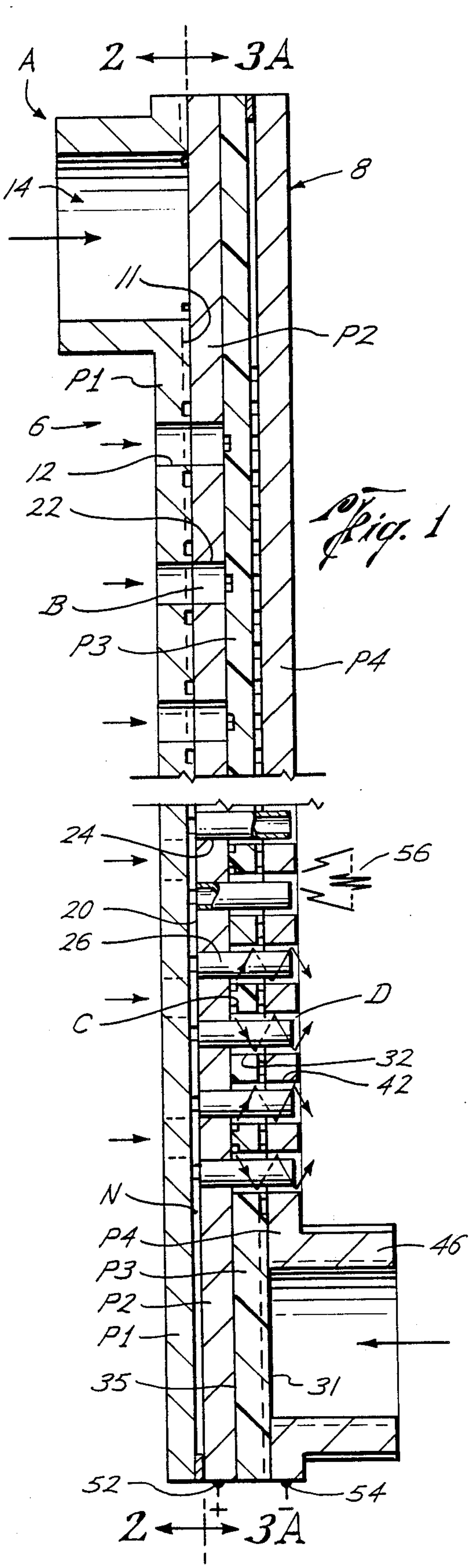
FIG. 1 is an enlarged cross-sectional view of a section of a multivortex device of the present invention.

Referring to FIG. 1, a multivortex device A of the present invention adapted to allow the introduction of a second and third fluid to the flowing first fluid stream is shown. The apparatus includes four plates P1, P2, P3, P4 adapted to be oriented substantially perpendicular to the flow of a first fluid. Perforations in the plates and grooves and passageways between adjacent plates convert the non-turbulent flow of the first fluid into small, closely spaced vortices as the first fluid flows through the plates.

Figure 2:
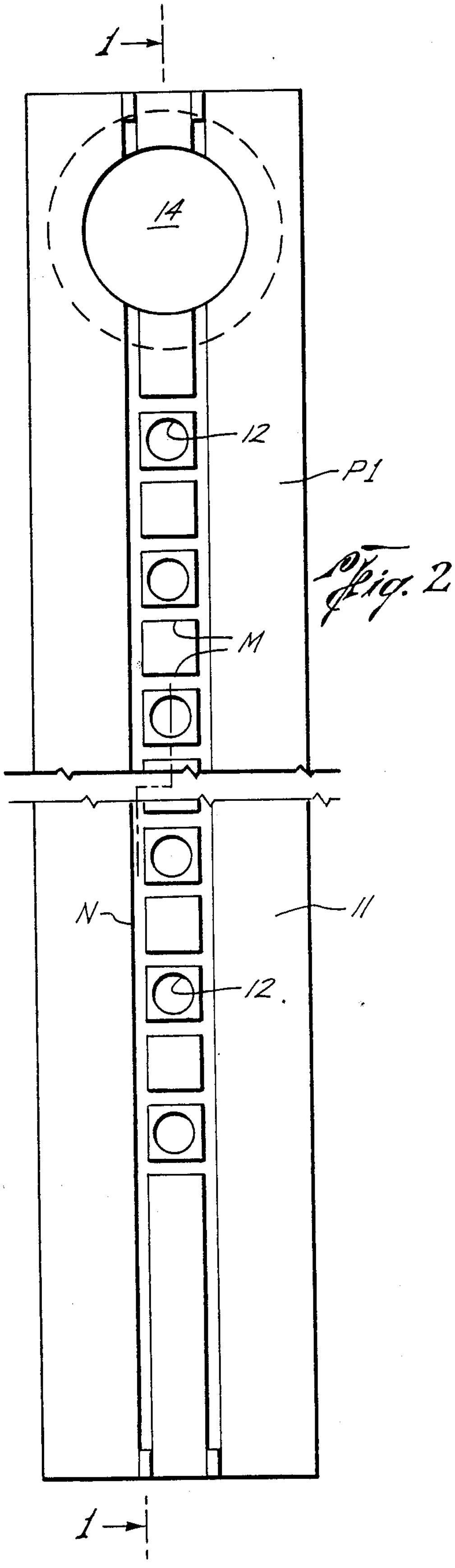
FIG. 2 is a plan view of a section of the downstream side of the first, plate of the multivortex generator of the present invention.

The first plate P1 includes a plurality of holes 12 therethrough. A second fluid entrance 14 is also provided in the first plate P1 to allow the introduction of a second fluid into a series of horizontal M and vertical N grooves cut into the downstream side 11 of the plate P1 (FIG. 2). The plurality of holes 12 through plate P1 are oriented between the intersections of the vertical M and horizontal N grooves. Plate P1 is preferably formed from a non-conductive material such as plastic.

Figure 3A:
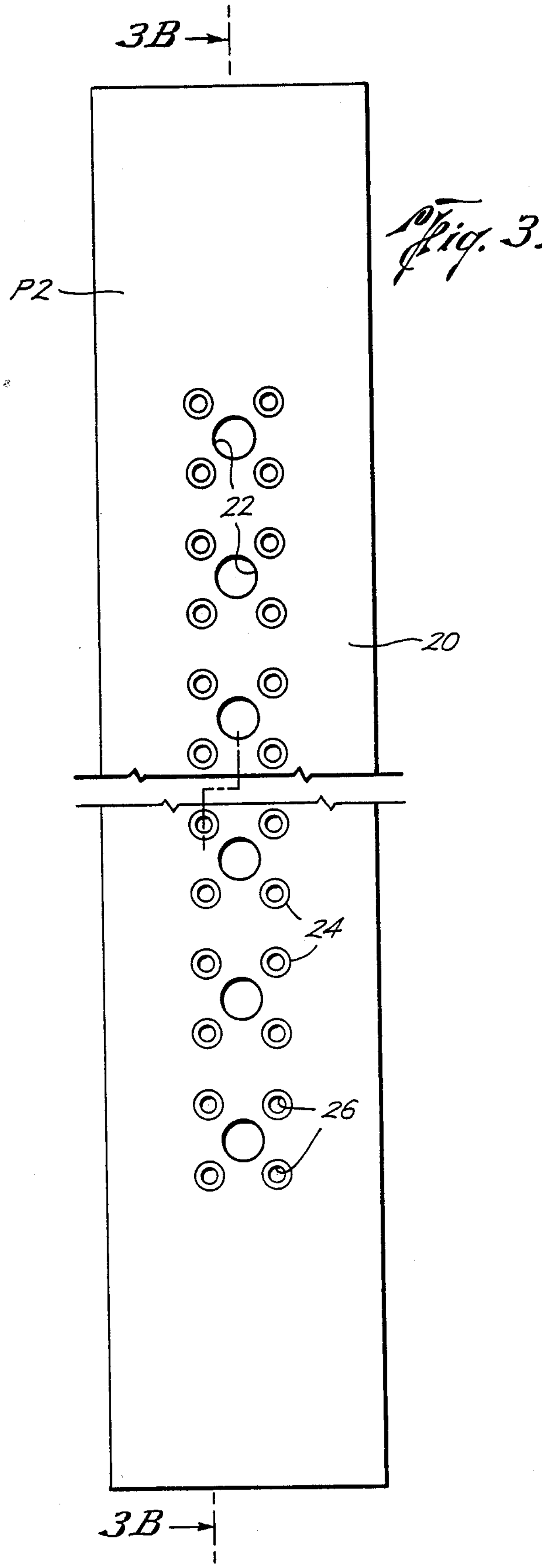
FIG. 3A is a plan view of a section of the upstream side of the second plate of the multivortex device of the present invention.
Figure 3B:
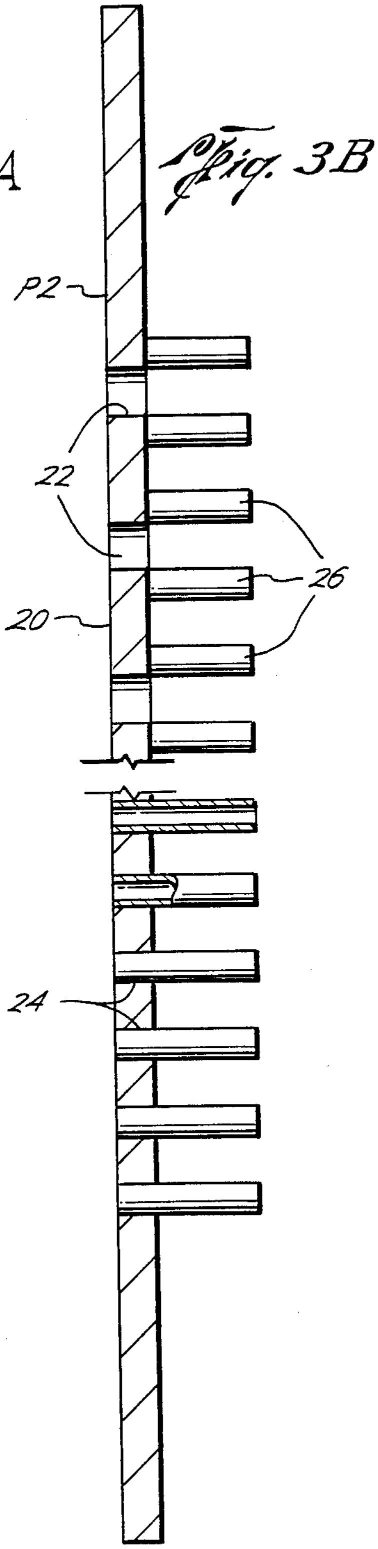
FIG. 3B is a cross-sectional view of a section of the second plate of the multivortex device of the present invention.

The second plate P2 is preferably formed from a conductive material such as metal if an electrostatic charge is to be created as discussed below. The upstream side 20 of plate P2 (FIG. 3A) includes a number of holes 22 corresponding to the holes 12 of plate P1. Oriented around each hole 22 are four smaller holes 24. Holes 24 are adapted to receive metallic tubes 26 (FIG. 3*b*) which extend from plate P2 in a downstream direction. Holes 24 are adapted to align with the intersections of the horizontal M and vertical N grooves of plate P1 when plate P1 is oriented adjacent to plate P2 with holes 12 and 22 in alignment (FIG. 1).

Figure 4A:
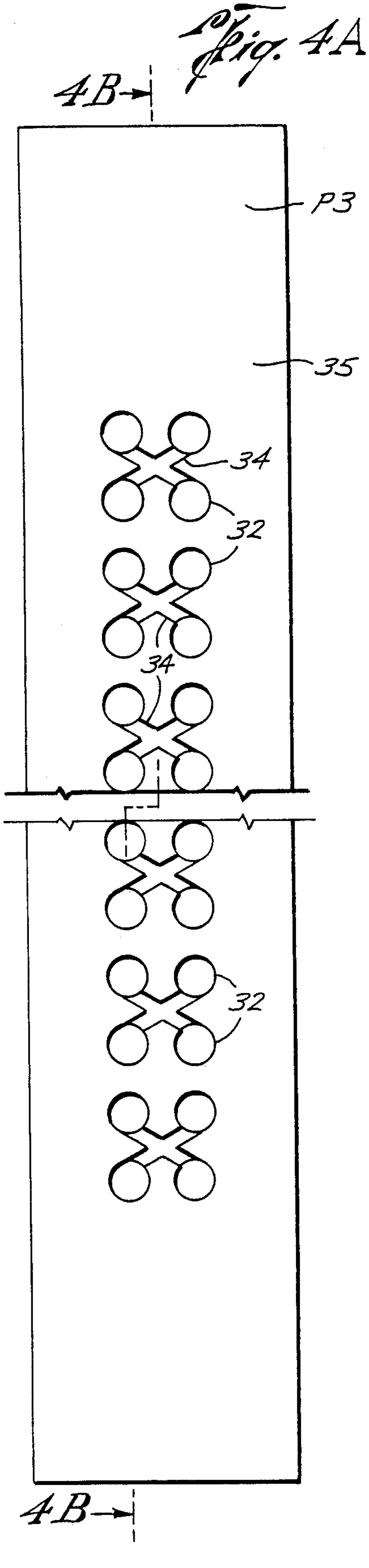
FIG. 4A is a plan view of a section of the upstream side of the third plate of the multivortex device of the present invention.
Figure 4B:
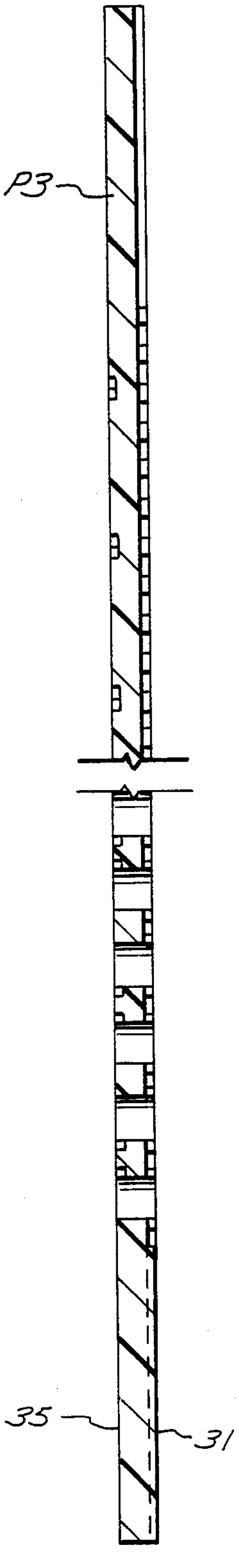
FIG. 4B is e cross-sectional view of a section of the third plate of the multivortex device of the present invention.
Figure 4C:
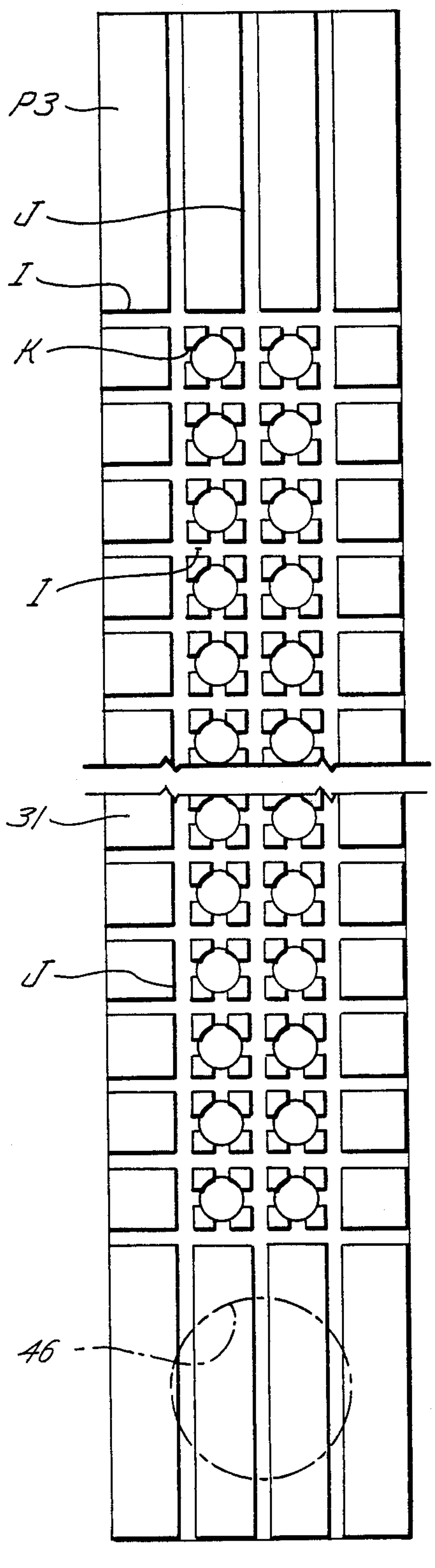
FIG. 4C is a plan view of a section of the downstream side of the third plate of the multivortex device of the present invention.

The next plate of the multivortex device of the present invention, plate P3, is preferably formed from a non-conductive material such as plastic. The third plate P3 of the multivortex device includes a plurality of holes 32 therethrough oriented, and of such a size, so as to surround the metallic tubes 26 of the second plate P2 when plate P3 is oriented adjacent thereto (FIG. 1). The non-adjacent holes of each group of four holes 32 on the third plate P3 are interconnected by a groove 34 in the upstream side 35 of plate P3. The grooves 34 are adapted to provide flow passageways from each hole 22 of second plate P2 into the four adjacent holes 32 of third plate P3. The grooves 34 in third plate P3 intersect the holes 32 tangentially so as to impart a rotational flow to the fluid passing from the grooves 34 into the holes 32. The grooves 34 can be oriented such that the rotational flow in adjacent holes is the same (FIG. 4D) i.e. co-vortices or, the grooves 34 can intersect the holes tangentially such that the rotational flow pattern in adjacent holes 32 are opposite (FIG. 4A and 4E) i.e.

counter-vortices. The downstream side 31 of the third plate P3 (FIG. 4C) includes a series of horizontal I and vertical J grooves cut into the surface thereof providing a checkerboard type pattern surrounding each of the holes 32. Extending from each hole 32 are grooves K which intersect with the horizontal I and vertical J grooves as shown in FIG. 4C.

Figure 5:
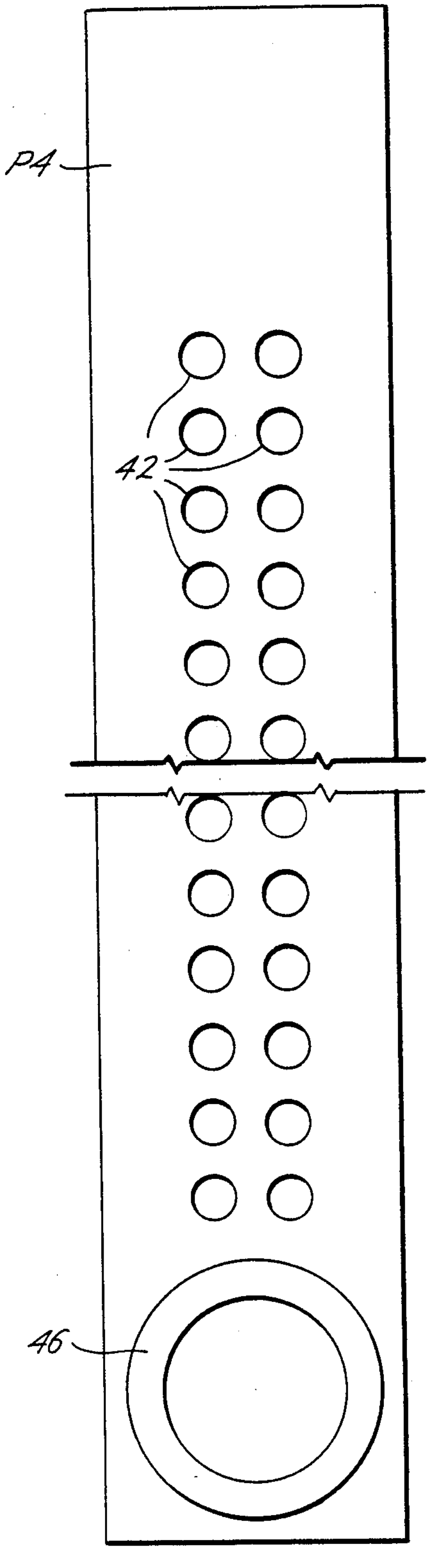
FIG. 5 is a plan view of a section of the upstream side of the fourth plate of the multivortex device of the present invention.

The fourth plate P4 of the present invention is preferably a conductive material such as aluminum or brass is shown in FIG. 5. The fourth plate P4 includes a plurality of holes 42 corresponding in size and orientation to the holes 32 in plate P3 and similarly adapted to surround tubes 26 of second plate P2. The tubes 26 of plate P2 are such a length that they extend substantially to the downstream surface 41 of fourth plate P4. Fourth plate P4 also includes a fitting 46 to allow the injection of a third fluid between third plate P3 and fourth plate P4 into the horizontal I and vertical J grooves, through grooves K and into the holes 42.

When the four plates P1, P2, P3, P4 of the multivortex device of the present invention are assembled as shown in FIG. 1, an apparatus is provided which will convert a non-uniform fluid flow into a plurality of adjacent vortices. A first fluid, typically air, flowing essentially perpendicular to the multivortex apparatus A flows through holes 12 of plate P1, through the corresponding holes 22 of plate P2, through the grooves 34 of plate P3 which lead the air flow into the holes 32 of third plate P3 tangentially to create a rotational flow pattern. The rotational forces created by the tangential entry of the air flow into the holes 32 of third plate P3 are enhanced as the air flows around tubes 26 extending through the holes 32 of third plate P3 and on through the holes 42 of fourth plate P4. Thus, the uniform air flow on the upstream side 6 of the apparatus A is converted into a plurality of vortices on the downstream side 8 of the apparatus A. The rotation of adjacent vortices can be the same or opposite, depending upon the tangential entry of the air from grooves 34 into holes 32 of third plate P3. A second fluid can be injected into the center of each vortex, by injecting a second fluid in the fitting 14 of first plate P1. The second fluid flows between adjacent plates P1, P2 and through tubes 26 of plate P2 as shown by arrows 50 in FIG. 1. The second fluid atomizes as it leaves tubes 26 and the drops of this atomization are electrically neutral. A third fluid can be injected into the exterior of each individual vortex. If desired the third fluid droplets, after atomization, can be electrically charged. The third fluid is injected into fitting 46 of fourth plate P4 into the horizontal I and vertical J grooves in the downstream side 31 of third plate P3. These grooves allow injection of the third fluid into the aligned holes 32 of third plate P3 and holes 42 of fourth plate P4 where the rotating air forces the fluid to flow as a thin film along the wall of the holes 42 in the fourth plate P4. If desired, a voltage differential may be applied across the metallic second plate P2 and the metallic fourth plate P4 to establish a radial electric field Q (FIG. 1) between metal tubes 26 and the walls of the holes 42 in the metal fourth plate P4. This electric field Q would be established by attaching conductors 52, 54 to second and fourth plates P2, P4, respectively. This electric field Q through the thin film of fluid induces a surface charge that remains on the fluid drops after atomization occurs at the exit of the holes 42. Although the drops from the tubes are electrically neutral, they tend to cluster around the charged drops from holes 42 due to the electrostatic attraction between charged drops and induced dipoles in the uncharged drops. Turbulence increases the rate of clustering, and the rotational kinetic energy of the co-vortices is converted into high speed turbulence within a few vortex diameters. The shape of the spray is determined by the pattern of vortices in the space.

The advantages of this method of atomizing, charging, mixing and spraying fluids are:

(1) Versatility (conventional methods require special equipment for each type of fluid)

(2) Low operating cost (vortex atomization requires less power than axial flow atomization to achieve the same drop size for the same fluid flow rate)

(3) Low construction cost (plastic and metal plates can be molded and assembled very cheaply)

(4) Safety (Inductive charging can be done inside the device with an applied voltage several times less than that required by conventional electrostatic spray devices)

(5) Superior coatings (conventional electrostatic spray devices achieve high collection efficiency at the expense of uniform coating on irregular surfaces, but the highly turbulent slow moving cloud of charged particles produced by this device penetrates deeply into holes, crevices and coats sharp edges and points to the same thickness on all surfaces, with equally high collection efficiency.)

Figure 4D:
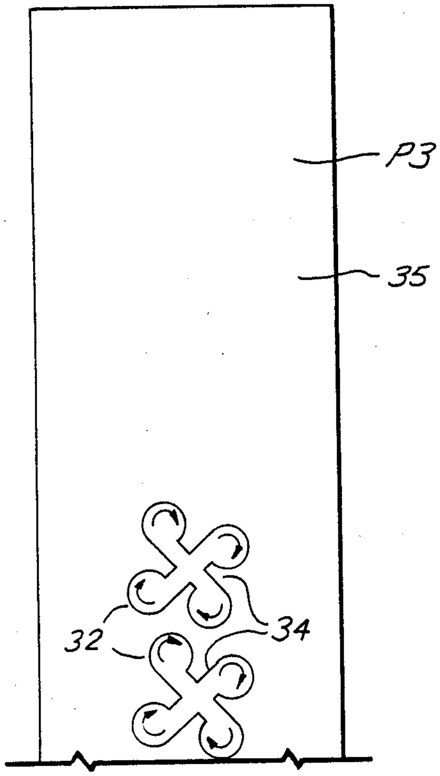
FIG. 4D is a plan view of an alternate embodiment of a section of the downstream side of the third plate of the multivortex device of the present invention.
Figure 4E:
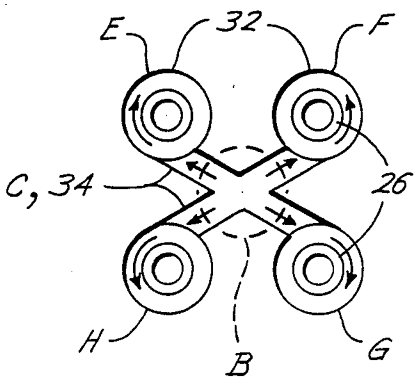
FIG. 4E is a plan view of one set of openings for FIG. 4A.

This device can be used to mass produce paint, to mix pigment particles dispensed in air with resins dissolved in solvents. The resulting charged paint particles can be collected electrostatically for future use, or they can be used as produced. If the atomizing air is sufficiently hot, the solvents can be flashed off to produce dry paint particles that can be collected easily and used later. A co-vortex device which employs grooves in third plate P3 as shown in FIG. 4D which results in adjacent vortices flowing in the same directions can be used, for example, to carry out other chemical reactions. For example, pulverized coal or fuel oil can be burned in such a device, with ignition achieved by increasing the applied voltage between tubes 26 and fourth plate P4 sufficiently to induce sparks 56. A conventional heat exchanger coil or coils in the path of the hot turbulent exhaust gas would serve as a very efficient steam generator because the heat transfer rate is enhanced by the high level of turbulence.

Such a co-vortex device could also be useful as a smoke generator. If one of the fluids atomized is oil, because of its low surface tension, an extremely fine, even submicron, droplet could be produced that would quickly diffuse over a wide area due to turbulence. To disperse such a cloud, the device could then be employed to charge oil droplets that would cause the neutral droplets to cluster around the charged ones resulting in dispersion of the smoke screen due to clustering, gravitational and electrostatic settling.

For example, a co-vortex spray device having the following dimensions and operating characteristics has proven highly effective. The four plates P1, P2, P3, P4 were dimensioned $\frac{1}{8}$ inch thick and 1 inch wide by 10 inches long. The first plate P1 was provided with sixty-four $\frac{1}{8}$ inch vortex holes 12 on $\frac{1}{4}$ inch centers in a pattern two holes by thirty-two holes. The crisscross and tangential inlet slots I, J, K in the third plate P3 were 1/32 inch wide and 1/64 inch deep. The metal tubes in each surrounding hole in the second plate P2 were 1/16 inch in diameter. With an inlet air pressure of 30 psig, rotating air speed would be approximately 300 meters per second and an actual vortex speed of approximately 12 meters per second. The air flow rate would be approximately 26 standard cubic feet per minute. Such an apparatus can finely atomize as much as 10 grams per second (approximately equal to 9 gallons per hour of liquid), producing droplets of approximately 10 microns in radius with a charge/mass ratio of approximately $10^{-4}$ coulombs per kilogram with a current of approximately 10 microamperes flowing from the device to grounded surfaces. With a droplet radius of approximately 10 microns, the mobility of the charged drop is approximately $10^{-6}$ meters squared per volt second which would result in a high collection efficiency.

Figure 6:
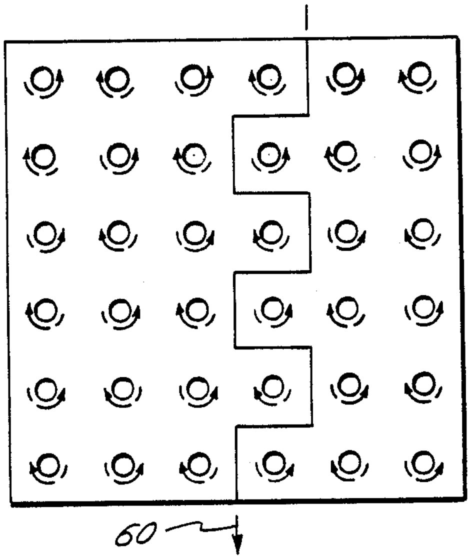
FIG. 6 is a plan view of the downstream side of one embodiment of the multivortex device of the present invention showing the flow pattern.

In a counter-rotating device (FIG. 4A), the grooves 34 would direct air tangentially to each four adjacent vortex holes 32 so that the air in adjacent vortex holes rotates in opposite directions. In such a countervortex arrangement, the resulting vortices roll upon one another substantially without friction almost like ball bearings, thereby persisting for many diameters downstream. Particles in the vortices are thrown by centrifugal force into the spaces between adjacent vortices where they tend to agglomerate and where gravity induces the particles to leave the spaces in a downward direction 60 (see FIG. 6). Hence, the vortices actually pump particles down at a speed of approximately V divided by 4 compared to the slow axial speed U.

Figure 7:
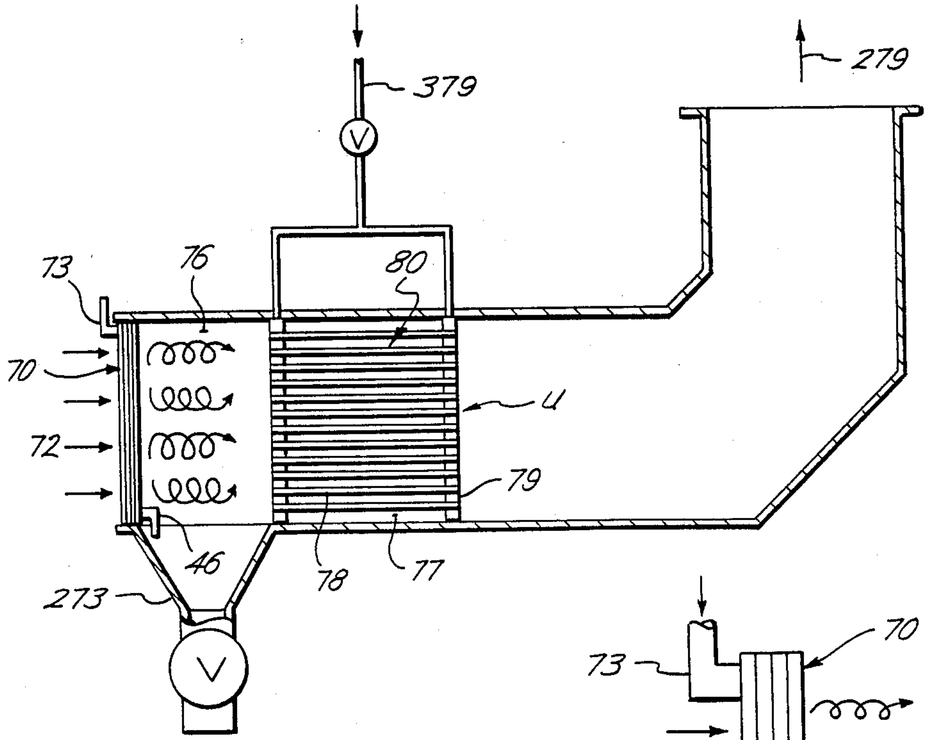
FIG. 7 is a sectional side view of a combustor with heat exchanger employing the multivortex device of the present invention.
Figure 7A:
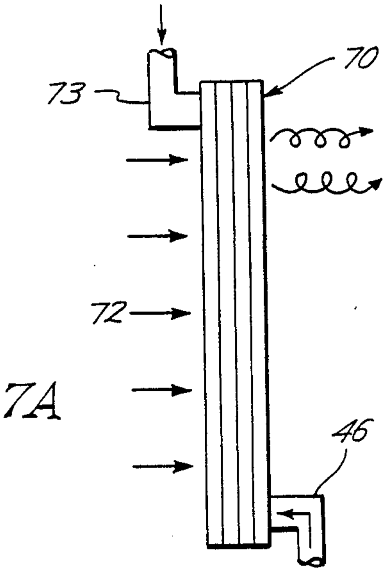
FIG. 7A is a detail of the front portion of FIG. 7.

As an example, FIG. 7 shows a pulverized coal combustor with hot gas cleanup and heat exchanger directly in line in which such a countervortex multivortex apparatus is employed. The countervortex device 70 is located at the inlet 72, in which air is injected as the first fluid. Pulverized coal mixture 73 is injected as the second fluid. The mixture 73 forms a slow moving film along the vortex holes that is exposed to high speed rotation of hot air after initial ignition, within the holes. In such an apparatus, the oxidation is extremely rapid because the particles are small and because the sheer stresses and mass transfer rates are very high. The coal is reduced to ash before it leaves the holes 42; the ash is then thrown into the spaces between adjacent vortices and with the help of gravity is deposited in a hopper 273 below. In this application, there is no need for the tubes 26 as shown in FIG. 1, however, a third fluid or chemical may be injected through fitting 46. Injection of a fluid such as ammonia for the purpose of converting sulfur dioxide into ammonia sulfate particles—that can be precipitated and also can suppress nitrogen oxides that might otherwise be formed—can be employed. In place of the metal employed in second plate P2 and fourth plate P4, a graphite impregnated ceramic material may be employed to better resist the temperature and erosion without sacrificing electrical conductivity. Immediately downstream of the precipitator section 76, which is preferably approximately ten vortex diameters long, there is a heat exchanger 78 which includes copper tubes 77 in line with the counterrotating vortices. Rotating flow entering such tubes 77 rapidly transfers heat through the tube walls and the heat may be picked up by water evaporating on the outside of such tubes 77 to generate steam. The length of such a heat exchanger 78 is much shorter than a conventional exchanger because the heat transfer coefficient is high as a result of the high Reynolds number associated with the high speed rotation of the hot fluid. The efficiency of the heat exchanger 78 is further enhanced by the slow axial movement of the hot fluid. To further improve the efficiency of the heat exchanger 78, water 379 can be injected as a spray 380 through narrow annular gaps (not shown) around each tube at the downstream end 79 to flow upstream (arrow U in FIG. 7) as a thin film along the tubes 77. Evaporation of the water forming drops of water and vapor or wet steam that continues to dry out as it moves in the upstream direction toward the exhaust 279 of the exchanger 78. As long as there is not a blanket of water on the heat exchanger tubes 77, evaporative cooling of the tubes 77 can remove heat very rapidly, and the heat exchanger 78 need only be on the order of ten vortices diameters long. Therefore, the combustor with hot gas cleanup and heat exchanger may have overall length of approximately thirty-five vortex diameters, such as four inches for ⅛ inch vortices. Such a combustion system may be employed to destroy pulverized and liquid hazardous waste as well as to burn fossil fuels. The advantages of this combustion system are:

(1) Versatility (this system can be used to destroy pulverized and liquid hazardous wastes as well as to burn fossil fuels)

(2) High combustion efficiency (the high level of turbulence in the combustion boundary layer assures rapid and complete oxidation in a very short distance)

(3) Efficient Emission Control (Unlike conventional gas cleanup systems, particulates are removed immediately, and well known chemical techniques can be used to convert noxious gases into particulates that also can be removed within a very short distance; e.g. ammonia to form ammonium sulfate particulates and to suppress nitrogen oxide and mixing a limestone with the coal to form calcium sulfate particulates that can easily be removed.)

(4) More compact and efficient steam generation (conventional systems use much larger heat exchangers and periodically they have to be shut down for cleaning, which is not necessary with this device).

(5) There is the option of directly driving a gas turbine with the hot clean gas rather than generating steam.

(6) Easy scale-up (the capacity of this system is increased by simply increasing its cross sectional area).

Such a combustor exhibits a high combustion efficiency due to the high level of turbulence in the combustion boundary layer which assures rapid and complete oxidation in a very short distance. Further, such a combustor exhibits low emissions due to the particulate removal as well as the use of chemical techniques to precipitate and remove noxious chemicals which may be incorporated directly within the combustor.

As an example, a small combustor with a square array of six by six holes in plates P1 and P2 ⅛ inch in diameter in a duct approximately 1½ inches square with a pressure drop of twenty inches of water creates vortices having a rotational speed of approximately eighty meters per second and an axial speed of approximately ten meters per second with the cross grooves in plate P3 being 1/32 inch wide and 1/16 inch deep. The air flow in such an apparatus would be approximately twenty standard cubic feet per minute, and the system could burn pulverized coal at the rate of approximately one gram per second generating approximately $10^4$ watts of thermal power. A $10^6$ watt system would simply be scaled up one hundred times. Such a scale up would result in a cross-sectional area of fifteen by fifteen inches for the duct size. The length would remain the same.

In addition to being used to burn pulverized coal, such a system could be used to burn hazardous waste with the vortex generator and precipitator section used to clean particulates and noxious gases out of the exhaust. The small system described above has demonstrated efficiencies in excess of 99% in removing tobacco smoke, oil and water mist, and AC fine dust (a standard dust for evaluating effectiveness of dust filtration) from an air stream.

Figure 8A:
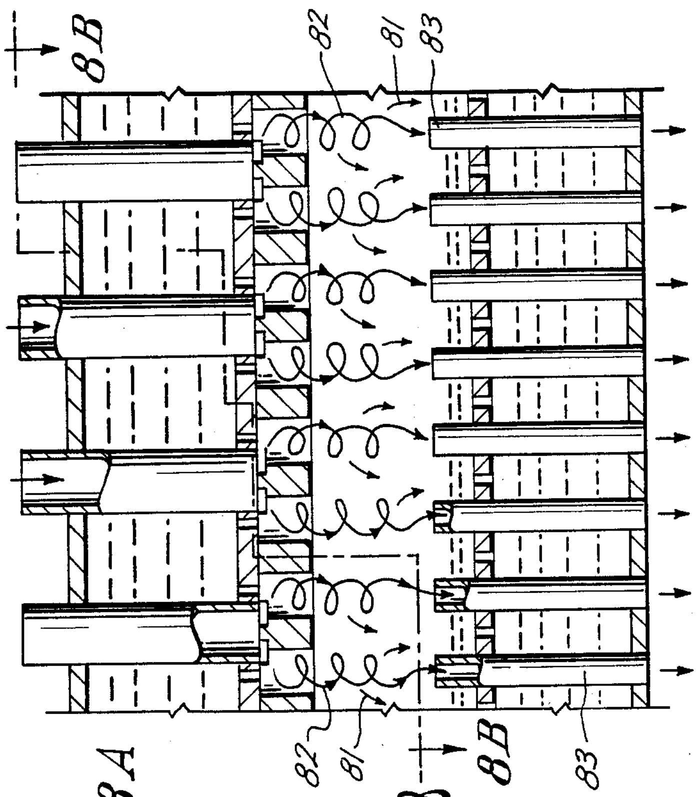
FIG. 8A is a cross-sectional enlargement of the multivortex device employed in the aerator separator of FIG. 8.
Figure 8B:
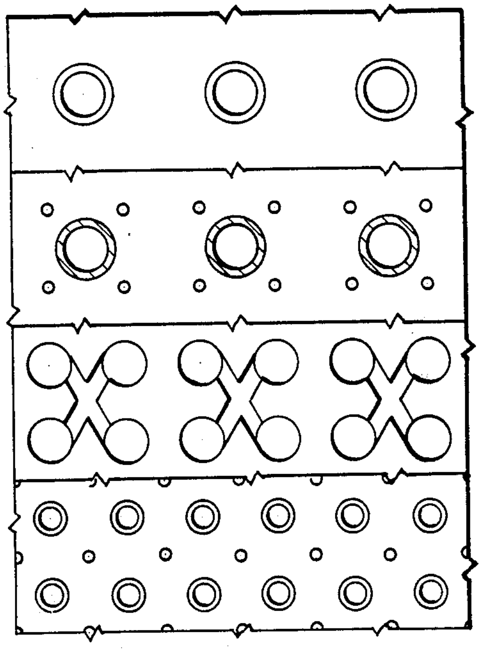
FIG. 8B is a top plan view partially in section of the multivortex device, the aerator separator shown in FIG. 8.
Figure 8:
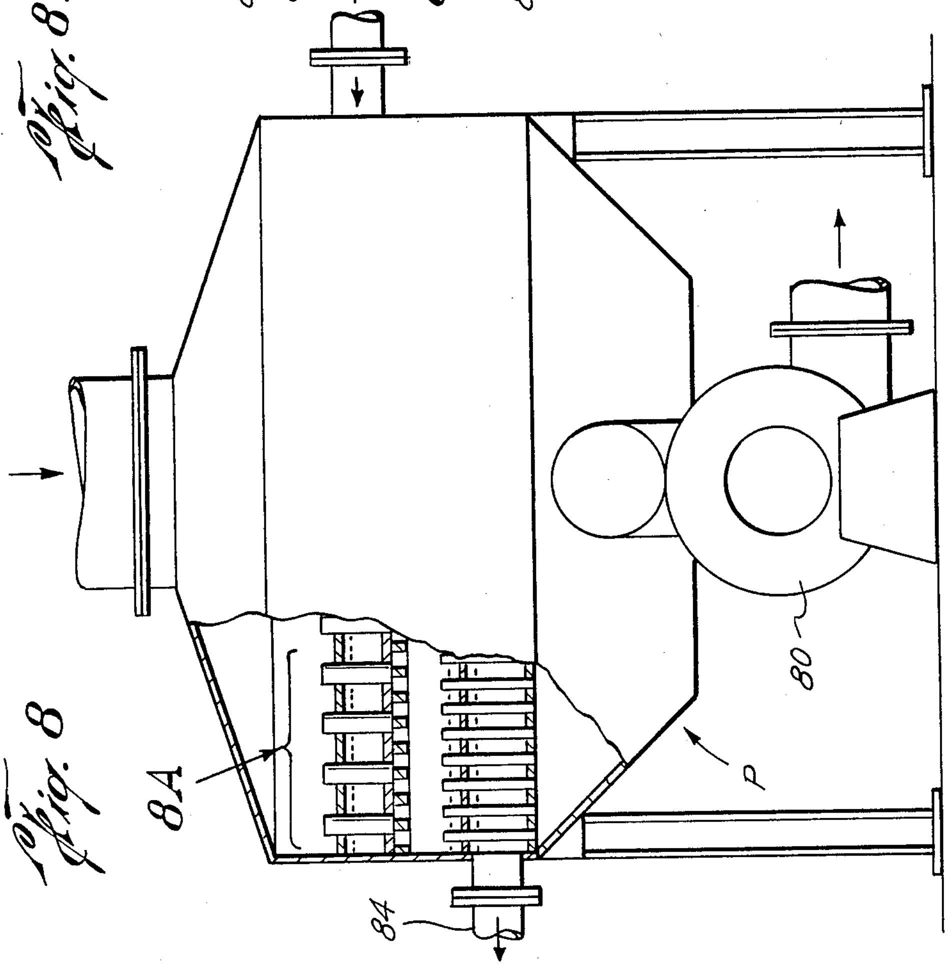
FIG. 8 is a side view partially in section of a water purification apparatus employing the multivortex device of the present invention.

FIGS. 8, 8A, and 8B show an alternative use of the multivortex device of the present invention in which the multivortex apparatus is employed for removing volatile chemicals from water by aeration. Such an apparatus employs a vertical orientation of the multivortex device. A fan 80 at the bottom of the device D introduces air to flow from top to bottom. A counter-vortex field is established, as previously set out, with a dirty water stream injected along the walls of the vortex holes. In the vortex holes, just before atomization any volatile chemicals in the water flash out of the thin film of water. Mass transfer of volatiles from the dirty water stream is extremely rapid due to the high level of turbulence at the interface between the fluid film on the wall and the high speed rotating air stream. As the thin film of water leaves the vortex holes, the water is atomized and thrown into the spaces 81 between adjacent counter-rotating vortices 82 (FIG. 8A). After approximately 10 vortex diameters, the vortices 82 enter a plurality of thin wall tubes 83 that lead the air to the exhaust fan 80. The clean water 81 agglomerates and falls between these tubes 83 to flow out of the exhaust pipe 84. A check value (not shown) would be located in air exhaust pipe 84 to prevent air from being sucked into the device during start up. Such a multivortex aerator/separator when compared to a conventional packed counterflow air stripping tower is much more economical. A typical packed counterflow air stripping tower capable of cleaning twenty-five hundred gallons per minute is nine feet by nine feet by twenty-five feet tall, while a multivortex gas aerator/separator with a similar capacity would be approximately 6½ by 6½ by 2½ feet tall, or twenty times smaller in volume. Both the conventional counterflow tower and the multivortex aerator/separator have an air/water ratio of thirty by volume and a pressure drop of approximately three inches of water. Both devices similarly have a fan power requirement, such as approximately five horsepower, however the power required to pump the water into the multivortex aerator/separator is approximately 1/10 that required to pump water into a conventional tower because of the height ratio. For example the conventional tower would require 20,000 lbs/min×25.5 feet=510,000 ft-lbs/min, or 5 horsepower.

Theoretically, the ratio of final to initial concentration of volatile chemicals remaining in the water is approximately $n'_f/n'_o=(RT/H)(V'/V)$ where V/V' is the air to water ratio by volume, H is Henry's constant, R is the universal gas constant, and T is temperature. For a typical contaminant like TCE, H/RT=1/2.22, and with V/V'=30 and $n'_f/n'_o=0.074$, a removal efficiency of 92% is achieved. The length required to achieve this efficiency is found according to the following equation: L approximately equals 5duV'/4cV where d equals the vortex diameter of approximately $3\times10^{-3}$ meters, u equals axial speed of ten meters per second, and c is the mean speed of turbulence induced by the rotational speed v, which is approximately 0.01 v or approximately 0.32 meters per second induced by a rotational speed of v equal to 32 meters per second. Therefore, L equals approximately 0.004 meters or an L/d ratio of approximately 1.33. Similar results could be obtained when analyzing combustion or other chemical reactions between a thin film of reactant and a high speed rotating gas. For example, for combustion, one would consider the carbon and hydrogen leaving the thin film to form $CO_2$ and $H_2O$ in air.

The aerator described in FIG. 8 has many other uses. For example, if a low viscosity silicon oil, having extremely low vapor pressure, is used in place of water, air can be de-humidified and cleansed of dust, pollen and other suspended particulates as the vortices encounter the thin films of oil. De-humidification occurs because water molecules striking the oil surface form condensate droplets that are more dense than the oil, so centrifugal force drives them into the oil films. Then, the liquid water cannot re-evaporate back into the air. The water can later be separated from the oil in a settling tank like the one shown in FIG. 9 described below.

This system could be used as an air-conditioner by introducing the proper amount of water spray into the de-humidified exhaust air, causing cooling by evaporation. Air-conditioners of this type would have advantage of compactness, quietness, and lower cost compared to conventional air-conditioners, because the air compressor and several heat exchangers would be unnecessary. Furthermore, the inlet air filter that has to be periodically removed and cleaned would be eliminated; instead, the dirt would be screened from the oil entering the settling tank, and this filter would be easy to remove and clean or discarded, because it resembles the oil filter in an automobile.

Figure 9:
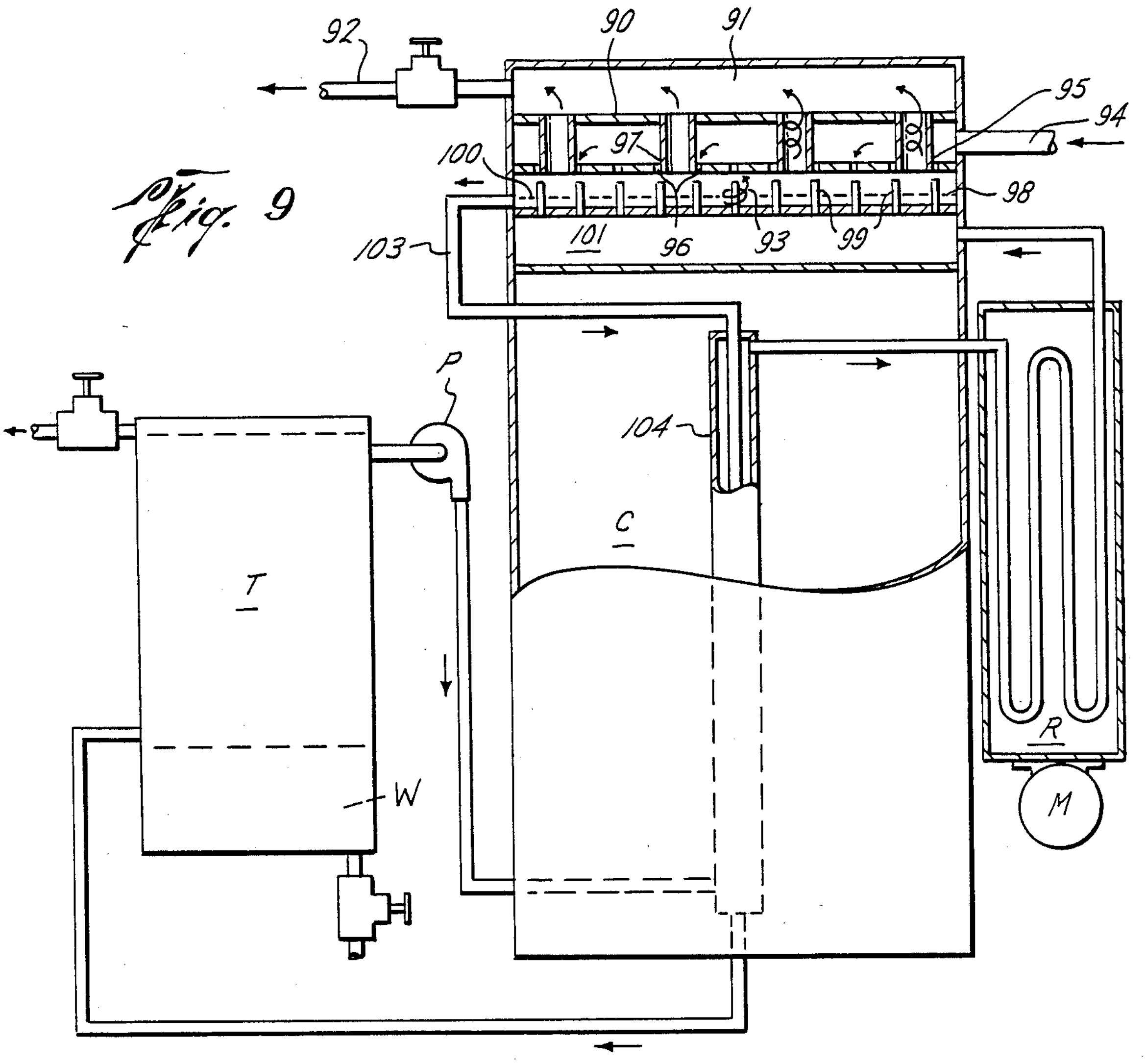
FIG. 9 is a flow diagram of a system for removing condensable vapors from air employing the multivortex device of the present invention.

FIG. 9 shows an alternate use of the multivortex apparatus of the present invention wherein a multivortex heat exchanger including a subsystem for recycling refrigerated solvent is disclosed. The system includes a solvent container C, which is made of a material, such as plastic or glass, that is resistant to the solvent. At the top of container C are two compartments 91, 93 separated by a disk 90. The upper compartment 91 contains the exhaust gas which exits through an outlet tube 92, while the incoming contaminated gas enters the lower compartment 93 through an inlet tube 94. A heat exchanger 95 is just above the lower compartment 93. Tubes 97 extending from the exhaust side 98 of the heat exchanger 95 are mounted through the lower compartment 93 into the upper compartment 91. The contaminated gas in the lower compartment 93 enters holes 96 in the heat exchanger 95 through small tangential inlets which cause the gas to spin in a vortex in each hole 96. At the exit of each hole 96, a hypodermic needle 99 injects refrigerated solvent from a pool 101 into the vortex. The solvent is atomized into tiny droplets by the high speed rotating gas. These droplets are thrown radially outwardly by centrifugal force into the space between adjacent vortices where they agglomerate and fall by gravity into the pool 100 below. The rotating gas continues to rotate in the same direction and leaves the lower compartment 93 through tangential inlets in the entrance of the exhaust tubes 95 which are located between the inlet holes 96. The spinning gas in the exhaust tubes 95 and in the inlet holes 96 cause heat transfer to be very rapid, hence, the heat exchanger 95 can be made sufficiently short such that the speed of rotation decreases only by a factor of two. By making the gas in adjacent inlet holes 95 spin in alternately clockwise and counter clockwise directions, adjacent vortices roll upon one another without friction and the rotation persists as the gas is turned and goes out through the exhaust tubes 95. The pool 100 of collected solvent contains the condensed solvent vapor along with other condensibles such as water vapor and some particulates. The solvent in pool 100 is removed through a tube 103 which is directed through the center of a counterflow heat exchanger 104 to the bottom of a settling tank T in which the water and the particulates W separate from the solvent which generally floats on top. The level of liquid in the settling tank T is kept equal to the level of collected liquid in the collector. Liquid is pumped by pump P from the top of the settling tank T to the counterflow heat exchanger 104 where it is cooled by the exhaust liquid flowing through tube 103. The partially cooled solvent is then flows to a refrigerator system R where it is further cooled before being directed into the lower compartment 93 of the cylinder C where the inlets to the hypodermic needles 99 are located. Thus, the only heat that has to be removed by the refrigerator system R is that released by the condensation of vapor, plus that due to the heat exchanger losses which can be quite small. A valve W is provided in the settling tank through which water and particulates can be removed and a valve X in the top of the settling tank T allows excess solvent to be added or removed.

One advantage of such a system is that a clean exhaust gas is provided which is approximately the same temperature as the dirty inlet gas and the collected contaminants are also close to this temperature. Also, the system can be scaled up by increasing its cross-sectional area so that it can handle a larger air flow rate, but the size of the tubes and the number per unit area would remain constant. It should be noted that the larger the number of tubes, the less effect the walls in the scrubbing section have upon the process.

It also should be noted, that the heat exchanger 95 is preferably a lamination of conductive materials, such as copper sheets, separated by thin layers of thermal insulation so that the heat cannot flow axially from one end to the other. This is highly desirable because the heat exchanger is preferably very short, and a large temperature difference is preferably maintained from one end to the other while at the same time, heat must be able to flow freely from the inlet tubes to the outlet tubes.

The simplicity of the construction and the compactness of the system, combined with relatively low power input to produce the rotating flows and to run the refrigerator R, yield a very competitive system both with respect to installation and operating cost compared to competing systems such as granulated, activated carbon absorption, condensers and afterburners with or without catalyst and/or heat recovery.

Figure 10:
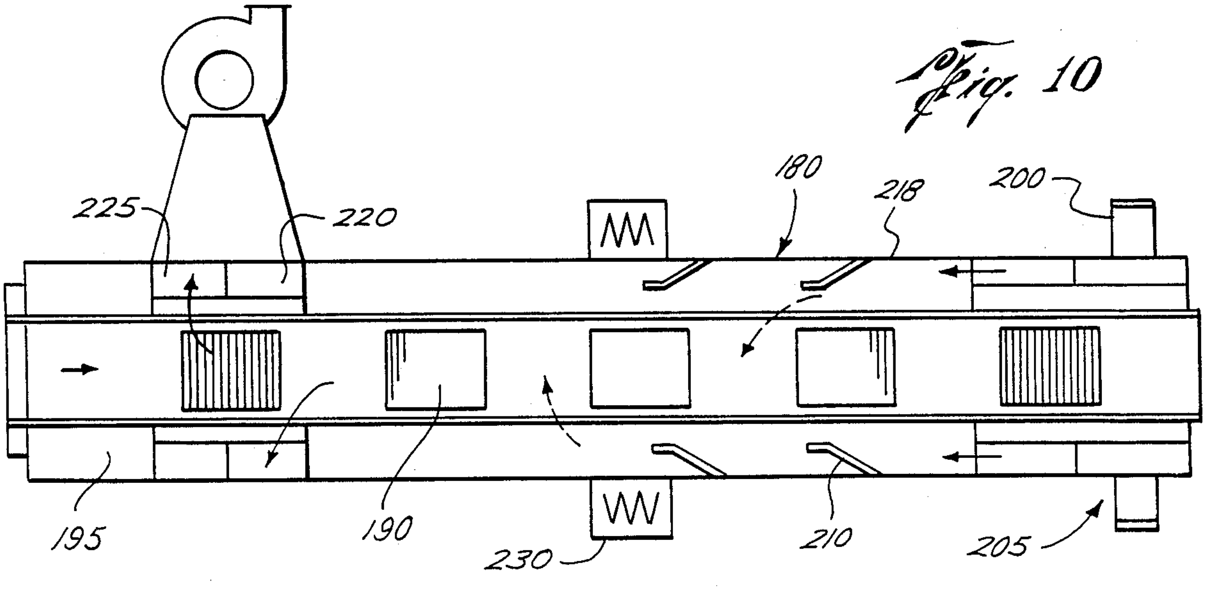
FIG. 10 is a cross-sectional side view of a system for curing painted parts, using the apparatus of FIG. 9.

In addition, a solvent separation system can be employed, shown in FIG. 10 as a solvent recovery system in an assembly line type of paint spraying operation. Such an apparatus may be employed to recover solvent for reuse and to prevent the release of the solvent into the atmosphere.

FIG. 10 is a schematic showing how painted parts on a mass production line can be cured in an oven in which most of the heat recovered from the parts and most of the solvent liberated by the cured paint is also recovered. The system includes a long thermally insulated tunnel 180 through which the parts 190 pass on a conveyor 195. Air is blown through the tunnel 180 by blowers 200, 205 in the opposite direction in which the parts 190 are moving. Deflectors 210 are located on the walls 215 of the tunnel 180 that induce turbulence which increases the rate of heat and mass transfer. This turbulence allows the tunnel 180 to be shortened. The air is sucked out at the other end of the tunnel 180 through multi-vortex solvent recovery systems 220, 225 like that shown in FIG. 9. In the center of the tunnel 180, there is a heat source, such as heater 230 to add sufficient heat to maintain the curing temperature at the desired level in this region. However, as the hot parts 190 leave this region, they lose heat to the incoming cool air and as the hot air leaves this region, it loses heat to the incoming cool parts 190. The advantage of the system is that the only thermal energy input requires is a small amount that is not recovered in the counter flow heat exchanger. Also, the solvent collected may be reused without the need for expensive air pollution control systems typically necessary to prevent solvent emissions.

FIG. 11 shows an alternate embodiment of the present invention wherein a multivortex device for pumping, atomizing, charging, and spraying two fluids is disclosed. The device includes four adjacent disks D1, D2, D3, D4 with the second disk D2 and the fourth disk D4 preferably of conductive metal materials. The disks D1, D2, D3, D4 are cemented together. The fourth disk D4 has a hole 110 in fluid communication within a metal tube 104. Tube 104 extends along the center line up to but not into disk D1. A first fluid enters hole 110 in disk D4 and flows through metal tube 104. A second fluid enters hole H2 in disk D4 and flows into the space 106 between disk D4 and disk D3. Disk D3 includes a plastic tube 108 concentric with metal tube 104. The second fluid flows through the annular gap G1 between tube 104 and tube 108 to the end of the tubes. An applied voltage between metal disks D4 and D2 by conductors 113, 115 establishes a radial electric field through this flowing fluid, and a surface charge is induced that remains on the liquid drops after atomization. The fluid emerging from metal tube 104 is also atomized, but the drops have no charge. However, turbulence and electrostatic dipole attraction cause the uncharged drops to cluster around the charged drops emerging from annular gap G1. Air used for atomizing enters the apparatus through opening H3 in disk D4 near its periphery and passes through aligned openings H4, H5 in disk D3, D2, respectively. The air is directed through a slot 117 located on the upstream side of disk D2 which directs the air tangentially into the center opening 112 of disk D2 so as to rotate the air in a clockwise direction in the annular gap G2 between the plastic tube 108 and the central opening 112 in the metal disc D2. A similar slot 119 in the upstream face of disk D1 leads air from opening H5 tangentially into the center opening 114 in disk D1 which is slightly larger than the central opening 112 in the disk D2, so that air rotates in a counterclockwise direction in the annular gap G3 between the clockwise vortex from gap G2 and the central opening 114 in disk D1. The inner clockwise vortex atomizes the fluid within the device and the outer counterclockwise vortex prevents drops from reaching and wetting the wall of the apparatus. A few vortex diameters downstream, the kinetic energy of rotation is converted to turbulence, and the axial speed of the charged spray is relatively slow, ideal for painting.

It can be shown theoretically that vortex atomization produce droplets of a radius approximately equal to $(3SIGMAr/\ RHO_1V^2)^{\frac{1}{2}}(1+m_1/m_a)$ where SIGMA is a surface tension of the liquid, r is the radius at which atomization occurs, v is the rotational speed at that radius, $RHO_1$ is the density of the liquid, $m_1$ is the mass flow rate of the liquid, and $m_a$ is the mass flow rate of air. In such a configuration, the advantage is achieved by the fluid's being atomized within the device where r remains as small as possible and v remains as large as possible, whereas when atomization is external, as in FIG. 2, the mean value of r is somewhat larger and v is somewhat smaller. Such an apparatus allows the concentric oppositely rotating vortices to atomize the liquid slightly inside the device without wetting the device. As a droplet rapidly moves radially outward due to centrifugal force, it encounters a mixing zone at the interface between the oppositely rotating vortices in which the rotational speed is close to zero, and the particles stop drifting outward just long enough to clear the opening 114 of the apparatus. Such a configuration can be effective with a single opening or multiple openings because of the stream coherence provided by the oppositely rotating concentric vortices. Further, vacuum is produced by the oppositely rotating vortices at the exit of the fluid tubes, hence, liquids can be pumped through the device.

The counter-vortex device can also be used to remove condensible gas molecules from gases by spinning the gas so fast that static temperature falls below the dew point and condensate forms and precipitates. For example, the decrease in static temperature is $DELTA\ T = RHOv^2/2\ c_p$.

where $c_p$ is approximately 1010 joules/kg-°C. is the heat capacity of air at constant pressure, RHO approximately equal to 1 kg/$m^3$ is the density of air, and if v is approximately 300 m/s for the rotational speed of the free vortices, then DELTA T is approximately 50° . Hence, starting with the gas at room temperature, the static temperature may be dropped to −25° C.. This is sufficient to condense water and many other solvent vapors.

The pressure drop required to do this is DELTAp approximately equals RHO$v^2$/2 and with RHO approximately equalling 1.3 kg/$m^3$, DELTAp approximately equals $5.85\times10^4 n/m^2$ or approximately equals 0.552 atmos. or approximately equals 8.11 psig.

Further, if these vortices were confined within tubes, the condensate droplets upon striking the tube walls would reevaporate because the temperature there is close to the stagnation temperature of the gas. Precipitation of condensate droplets is only possible because the free vortices of a countervortex device roll upon one another without generating friction and the static temperature remains low.

FIGS. 12 and 13 disclose alternate embodiments of the multivortex generating apparatus of the present invention. In FIGS. 12 and 13, the metallic tubes 26 of plate P2 shown in FIG. 1 are replaced by a hypodermic needle electrodes 150, 160, respectively, at high voltages extending at least to the lip 156 of plate P3. P3 would be the metal attractor electrode along which flows a thin film of either conductive or nonconductive liquid directed by lip 156 and the rotating air through it. Further, a lip 156 is provided on plate P3 around each hole 32. FIG. 12 discloses an apparatus for use when the fluid to be introduced into the air vortex is conductive wherein needle electrode 150 extends substantially through the downstream surface plate P4. FIG. 13 discloses an apparatus for use when the fluid to be introduced into the rotating vortex of air is nonconductive, wherein the needle electrode 160 extends substantially to the downstream extension of lip 156 of plate P3. The uniform radial electric field induces a surface charge on the conductive or nonconductive fluids so that droplets formed at the exit also have a charge. No current flows from either of the hypodermic tubes 150, 160 to the liquid through the air because the applied voltage is kept low enough preventing air from breaking down. For nonconductive fluids where the hypodermic tube 160 does not extend beyond vortex plate P3, the electric field is so intense at the tip of the tube 160 that a corona discharge from the tip sends charged molecules of one polarity to coat the surface of the nonconductive fluid flowing along the attractor wall. As the fluid breaks up at the exit, the drops carry away the charge.

Because many varying and different embodiments, as illustrated above, may be made within the scope of the inventive concept herein taught, including equivalent structures of materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A multivortex fluid flow apparatus for use with at least two fluids, comprising:

a series of adjacent plates;

each of said plates having a series of interconnected grooves and perforations, said plates having means for acting on the fluids through multiple adjacent vortices generated in the flow of the first fluid;

a first inlet to said plates for the inlet of the first fluid;

a plurality of outlets from said plates for the outlet of at least a portion of the first fluid;

a second inlet to said plates for the inlet of the second fluid; and said outlets includes an outlet for at least a portion of the first and second fluids;

said series of plates includes four plates and wherein said second plate inlet includes an opening through said first plate;

said first inlet includes a first set of substantially evenly space perforations through said first plate;

said first plate includes a first series of intersecting horizontal and vertical grooves cut into the downstream side of said first plate, said opening oriented to introduce the second fluid into said grooves and said first set of perforations oriented between the intersections of said grooves;

said second plate includes a second set of perforations corresponding in orientation to said first set of perforations;

a third series of sets of perforations each set being oriented around one perforation of said second set of perforations;

each perforation of said third sets of perforations having a tube at the downstream outlet, and the upstream inlet of each perforation of said third sets of perforations being aligned with the intersection of one of said horizontal grooves with one of said vertical grooves of said first series of intersecting horizontal and vertical grooves when said first plate is oriented adjacent said second plate with said first and second set of perforations aligned;

said third plate includes a fourth set of perforations oriented and of such a size so that each of said fourth set of perforations surround a corresponding one of said tubes when said second plate is oriented adjacent to said third plate;

a second series of crossing grooves cut into the upstream side of said third plate and adapted to provide flow passageways from said second set of perforations into said fourth set of perforations, said grooves intersecting said fourth set of perforations and having vortex means for imparting rotational flow to the first fluid passing from the second series of grooves to said fourth set of perforations;

said fourth plate includes a fifth set of perforations oriented and of such a size so that each of a said fifth set of perforations corresponds in size and orientation to the corresponding performation of said fourth set of perforations and surrounds a corresponding one of said tubes when said fourth plate is adjacent said third plate.

2. The apparatus of claim 1, wherein there is a third fluid and: said third plate includes a third series of intersecting horizontal and vertical grooves cut into the downstream side of said third plate, said fourth set of perforations being surrounded by said third series of grooves;

a fourth series of grooves cut in the downstream side of said third plate and intersecting said third series of grooves to provide fluid communication therebetween; and said fourth plate includes a third inlet to said plates, said third inlet including a second perforation through said fourth plate oriented to permit the third fluid to flow in said fourth series of grooves.

3. The apparatus of claim 1 wherein said vortex means includes tangential intersections of said second series of grooves with said fourth set of perforations.

4. The apparatus of claim 1, wherein said vortex means imparts co-vortex rotational flow to the first fluid.

5. The apparatus of claim 1 wherein said vortex means imparts counter-vortex rotational flow to the first fluid.

6. A multivortex fluid flow apparatus for use with at least three fluids, comprising:

a series of adjacent plates;

each of said plates having a series of interconnected grooves and perforations, said plates having means for acting on the fluids through multiple adjacent vortices generated in the flow of the first fluid;

a first inlet to said plates for the inlet of the first fluid;

a multiplicity of outlets from said plates for the outlet of at least a portion of the first fluid;

wherein said series of plates includes four plates and there is included a second inlet and a third inlet to said plates for the inlet of the second an third fluids, said third plate including a first set of grooves running substantially along said downstream face of said third plate;

a first gap between said first plate and said second plate;

said second inlet including a perforation through the first of said plates and in fluid communication with said first gap;

a first and second concentric tubes mounted in and between said second and third plates and interior concentric tube in fluid communication with said first gap;

a second gap between said second plate and said third plate;

said first inlet including a perforation through the first of three of said plates and in fluid commmunication with said second gap;

at least one opening in said fourth plate coxial with and adjacent said third plate performations and of diameter greater than the diameter of said third plate perforations; and a third gap between said third plate and said fourth plate in fluid communication with said third inlet and said grooves;

said outlets including an outlet for at least a portion of the three fluids.

* * * * *